United States Patent

[11] 3,543,731

[72] Inventor Lyn David
 19 Universe Drive, Levittown, New York 11756
[21] Appl. No. 757,270
[22] Filed Sept. 4, 1968
[45] Patented Dec. 1, 1970

[54] HIGH VELOCITY WATER HEATER
 13 Claims, 3 Drawing Figs.
[52] U.S. Cl. .................................................. 122/33, 122/406
[51] Int. Cl. .................................................. F22b 1/02
[50] Field of Search .......................................... 122/32, 33, 37, 250, 406

[56] References Cited
UNITED STATES PATENTS

| | | | |
|---|---|---|---|
| 2,554,338 | 5/1951 | Levine ........................... | 122/37X |
| 2,633,108 | 3/1953 | Sterick .......................... | 122/250 |
| 3,171,387 | 3/1965 | Muller ........................... | 122/33 |
| 3,398,721 | 8/1968 | Zangl ............................ | 122/406X |

*Primary Examiner*—Kenneth W. Sprague
*Attorney*—Jerome Bauer

ABSTRACT: A heater supplying hot water for space heating purposes and for home consumption having a burner fired by oil or gas fuel and in which cold water is supplied to two different heating paths, one of which delivers hot water for use in radiators to heat rooms, and the other delivers hot water to domestic plumbing for home use. The two paths are in heat exchange relationship with each other, and with the burner.

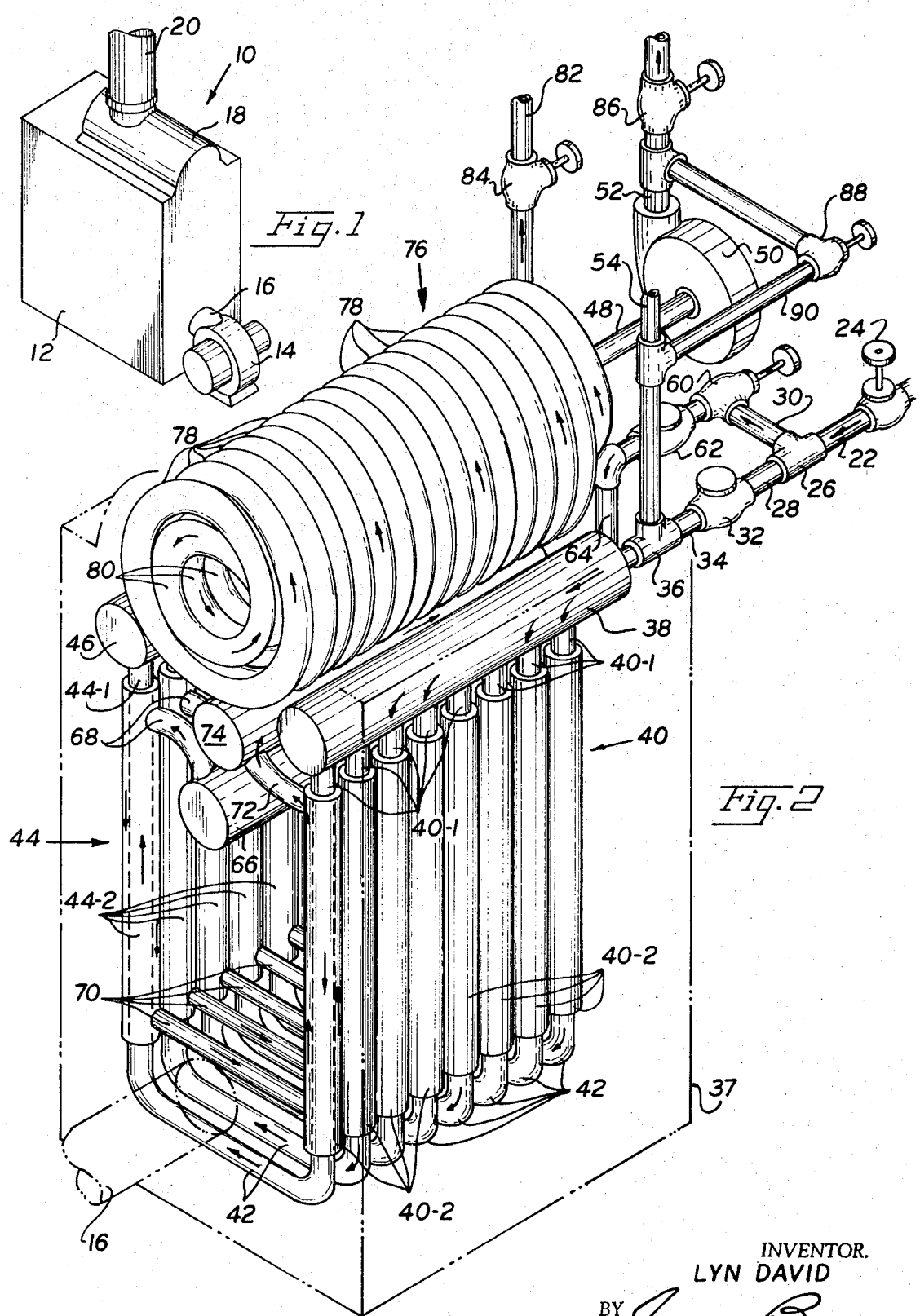

INVENTOR.
LYN DAVID
BY
ATTORNEY

HIGH VELOCITY WATER HEATER

FIELD OF THE INVENTION

This invention relates generally to water-heating equipment, and is particularly directed to a high-velocity furnace which heats water both for space heating purposes and for domestic use.

THE PRIOR ART

In the home furnace industry it is conventional to heat water both for space heating applications and domestic use within the same boiler enclosure. Furnaces of this type have been designed to provide two distinct flow paths, one for the heating water and the other for the domestic supply, with the two paths in heat exchange relationship with each other and with the furnace burner for more efficient heating and heat distribution. One of the ways in which a heat exchange relationship between the two distinct water paths has been achieved, is to provide a concentric pipe heat exchanger, or in some instances a plurality of such heat exchangers.

SUMMARY AND OBJECTS OF THE INVENTION

The present invention employs all of th foregoing techniques described as conventional, but in addition provide provides a superior geometric arrangement of the heat exchangers and other piping elements within the boiler enclosure, with the principal object of providing still more rapid heating and still more efficient heat distribution than prior art furnaces have been able to achieve. aspect of the invention provides a counterflow of water by means of which the rapidity of heating and the efficiency of heat distribution are still further enhanced beyond the level achieved by the prior art.

ultimate object of more rapid heating and more efficient heat transfer is, of course, greater fuel economy, since the same results can now be achieved by burning smaller quantities of fuel.

Economy of manufacture of the furnace is another objective of the invention. By providing a furnace design which does not require large and expensive hot water storage tanks, but which supplies all the hot water necessary for domestic use by means of a heating and storage coil which is compactly disposed within the boiler enclosure, substantial cost is achieved, Another important object of the invention is to provide a furnace which runs the water very rapidly through the heating unit at a high circulation speed, yet heats it adequately for space heating and domestic use, resulting in a high rate of delivered heat, despite the absence of a storage tank.

Still another object is to provide adequate quantities of water at desired high temperature and with sufficient circulation velocities to heat any desired space and also supply the same with sufficient hot water for domestic use.

In accordance with the invention these objectives are achieved by providing a high velocity water heater having a heat source and two distinct water flow paths in heat exchange relationship with each other and with the heat source. Heat exchange means are also provided which have distinct channels for the distinct water flow paths, and these channels are in heat exchange relationship with each other. In order to carry out the counter flow principle of the invention, the respective direction of water flow through these channels are mutually opposed. As a result, the hotter end of each water flow path is matched with the cooler end of the water flow path, for maximum efficiency of heat transfer an optimum temperature distribution throughout the system.

In another aspect of the invention there are a plurality of heat exchanger divided into a first group at one side of a heating enclosure and a second group at the opposite side of that enclosure. Respective connecter pipes extend from respective heat exchangers of he first group on one side of the heating enclosure, transversely through a central region of the enclosure between the two groups of heat exchanges, and over to respective heat exchanger of the second group situated on the opposite side of the heating enclosure. It has been found that this geometrical arrangement maximizes the exposure of the various conduits to the heat source, and consequently improves the rate and efficiency of water heating.

BRIEF OF DESCRIPTION OF DRAWING

FIG. 1. is a perspective view of an illustrative furnace in accordance with the present invention showing only the external configuration thereof.

FIG. 2 is a perspective view of the various water conduit elements within or adjacent to the heating enclosure of the furnace of FIG. 1 illustrating the novel geometric arrangement thereof.

The same reference characters refer to the same elements throughout the several views of the drawings.

DETAILED DESCRIPTION OF THE PREFERRED EMBODIMENT

Figure 3:
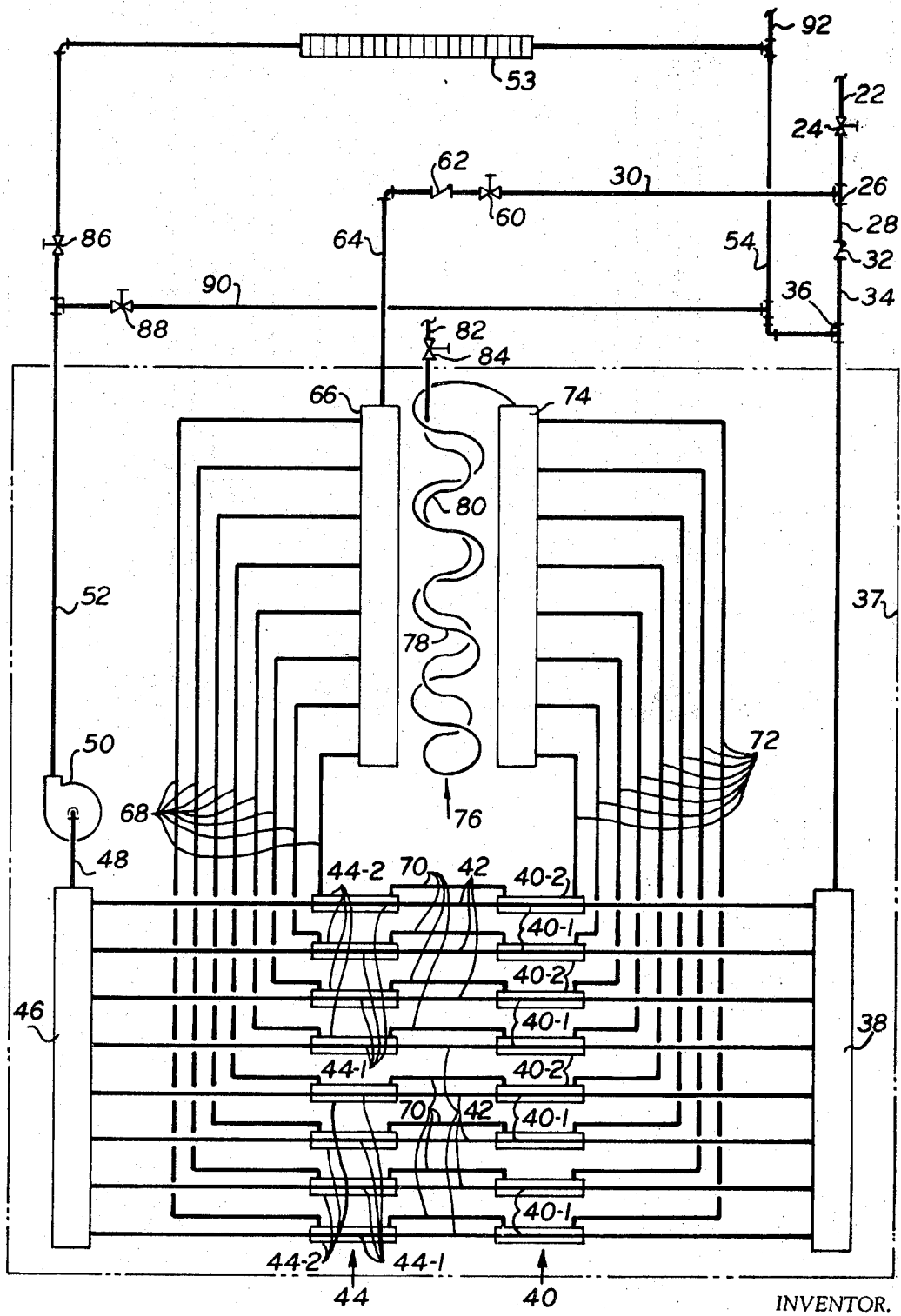
FIG. 3 is a schematic water flow circuit diagram of the various conduit elements of FIG. 2.

As seen in FIG. 1, the water heater of the invention, enclosed in a furnace, is generally identified by the numeral 10 and comprises an outer housing 12, the inside of which is properly baffled and insulated in accordance with conventional practice for the prevention of excessive heat loss. Such details form no part of this invention. The furnace 10 is, for illustrative purposes, shown to be of the oil-fired type comprising a conventional oil pump 14 which injects fuel oil into the enclosure 12 by means of a nozzle 16. The invention, however, is equally applicable to a gas-fired furnace or one which employs any other energy source. The fuel injected into the enclosure 12 by means of the nozzle 16 is burned within a properly insulated inner chamber situated beneath a rounded dome 18 protruding upwardly from the outer enclosure 12. The exhaust gases resulting from the combustion of fuel are evacuated through a conventional flue 20 extending vertically upward from the come dome 18.

With reference to FIG. 3, cold water from a supply such as a well or a city water system is initially brought in through a supply pipe 22. A main shutoff valve 24 controls this supply. Downstream from the main valve 24 the water entering the system divides into two distinct waterflow paths. The supply pipe 22 terminates in tee 26. From this tee, two pipes 28 and 30 branch off, each one representing a different one of two distinct waterflow paths. One of these flow paths, passing through the pipe 28, is destined for room radiator which serve to heat a house in cold weather, while the water flowing through the other pipe 30 is destined to be made available at the hot water taps for domestic use.

Turning our attention first to the circuit which serves the space heating function, the pipe 28 leads to a check valve 32 which prevents backup into the well or city water supply. From there a pipe 34 leads to another another tee 36. The only exit path from tee 36 leads into a heating enclosure 37 and goes to a heating system distribution manifold 38. From the manifold 38 the water is discharged along parallel-connected branch paths via a plurality of inner pipes 40—1, each of which belongs to one of a member of heat exchangers generally identified by numeral 40. These heat exchangers also include outer pipes 40—2 which concentrically surround their respective inner pipes 40—1. At the outer end of each of the inner pipes 40—1, the heating system water emerges through a plurality of respective connecter pipes 42 which discharge into respective inner pipes 44—1 of a second group of heat exchangers generally identified by numeral 44. The latter heat exchangers also comprise concentric outer pipes 44—2 surrounding the inner pipes 44—1.

The space heating hot water supply emerges from the inner pipes 44—1 of the heat exchange 44 and discharges into a collection manifold 46. From the manifold 46, heating water emerges through an outlet pipe 48 to a pump 50 which then forces the heated water through a conduit 52 to the radiator system 53 of After circulating through the radiators, the heating water returns back through a return pipe 54 to the tee 36, where it rejoins the heating waterflow path just described. During its traverse of the conduit elements 38 through 46 within the furnace enclosure 37, as described, the heating water is raised to a high temperature, then is circulated through the house radiators 53 for space heating purposes, and returns through the pipe 54 in cooler condition to be recycled, reheated and reused again for the purpose of space heating.

As previously noted, source water for the domestic hot water supply branches off from tee 26 into a diversion pipe 30. This pipe is controlled by a shutoff valve 60, and downstream from the valve 60 is a check valve 62 which prevents any backup of water from the heater 10 into the source. From the check valve 62 the flow proceeds through a pipe 64 to a distribution manifold 66 within the enclosure 37. From there water is distributed to a plurality of delivery pipes 68 that lead and direct their fluid into the confines of each of the respective outer concentric pipes or jackets 44—2 of the second group of heat exchangers 44. The water then emerges from the pipes 44—2 through a plurality of respective connecting pipes 70 which connect with the respective external concentric jackets for pipes 40—2 of the first group of heat exchangers 40. Thereafter the domestic hot water supply exits from the outer concentric pipes 40—2 through respective discharge pipes 72 into a collection manifold 74 for subsequent delivery to the domestic hot water supply system.

The present hot water heating system is of the tankless type, therefore it does not employ a large, bulky and expensive tank in which to store the hot water between the time it is heated and the time it is needed for domestic use. Instead, tankless systems store the hot water in various configurations of tubing which can be fit compactly within a small volume and which are less expensive to manufacture than tanks. Such tubing configurations hold less water, but this disadvantage is overcome by designing the storage tubing in such a way that as the volume of hot water entrained in the is being rapidly drained for domestic use, it is being immediately and continuously replaced by a fresh supply of hot water. As this description proceeds, it will be appreciated that the present invention contributes to the achievement of replacing used hot water to an extent exceeding the capability of prior art furnace systems.

The hot water supply storage function in the present system is assumed by a double wound helical coil generally identified by numeral 76 into which the domestic hot water supply flows from the collection manifold 74. The water flows initially from the manifold 74 through a first series of helical coil 78 of the coil system 76, extending from one end of the coil 78 to the other, and then the water flows back through the entire length of the coil 76 via a second doubling back series of helical coils 80. Hence, the domestic hot water subsequently emerges, under the pressure supplied by the city water system or other source, through an outlet pipe 82 controlled by a valve 84. The domestic hot water, of course, is ultimately dissipated into various drains and is not recycled.

Now that the distinct flow paths of the heating water and the domestic hot water supply have been traced, the reader is in a position to appreciate the way in which the novel geometric arrangement of the conduits within the enclosure 37 achieves superior heat transfer qualities, particularly in conjunction with the counter flow principle. With reference to FIG. 2, the oil nozzle 16 is at the place where it projects its greatest heat into the interior of the chamber 37 so as to elevate the the temperature of the water. The connecting pipes 70 and 42 are seen to be substantially in front of the oil nozzle 16, so as to be most efficiently heated by the flame. The heat exchangers 40 are seen to be grouped off to the right side, extending from approximately the level of the flame to a point somewhat above the flame. The other opposed group of heat exchangers 44 is similarly arranged at the the left of the combustion chamber 37. The coil is substantially centrally located between the right and left sides of the combustion chamber, and above the flame. The various manifolds 38, 46, 66 and 74 are clustered near the upper ends of the heat exchangers 40 and 44 and are also near the coil 76. Since the hot combustion gases raise upwardly from the flame issuing from the oil nozzle 16, the heat exchangers, the manifolds, and the coiled are all in position to be bathed by the rising hot gases, and in addition are closely spaced in heat exchange relationship with each other.

In FIG. 2 the arrows indicate the direction of water flow. Thus, as cold water for the heating system enters the manifold 38, it begins to be continues as it then proceeds downwardly through the inner pipes 40—1, and it is heated still more intensely by the jet of flame as it passes across the central region of the combustion chamber via the connecting pipes 42. The heating process continues as the water rises upwardly through the inner heat exchange pipes 44—1, and is discharged into the collection manifold 46. At this point, the water is hot enough to provide space heating as it exits from the furnace and is pumped through the radiator system.

Similarly, water for the domestic hot water supply begins to be heated as it enters the manifold 66, continues to be heated as it passes through the delivery pipes 68 and downwardly through the outer concentric pipes or jackets 44—2, and is heated still more intensely by the direct flame jet as it passes transversely across the central region of the combustion chamber via the connecting pipes 70. Heating still continues during the upward traverse of the outer heat exchanger pipes or jackets 44—2, and subsequent discharge through pipes 72 into the collection manifold 74. At that point, the hot water for domestic use flows into the coil 76. There it not only is stored until needed, but is further heated as it passes transversely through the upper part of the combustion chamber 37 along the convoluted path provided by the outer helical coils 78, and then passes back through the entire length of the upper part of the chamber through the inner helical coils 80. At this point it is ready to be discharged for domestic hot water use.

It will be appreciated that not only are these various conduits either in the path of the flame issuing from the oil nozzle 16 or situated so as to be bathed by the rising hot combustion gases, but in addition they are all clustered next to and, at times, within each other for efficient heat exchange therebetween, so that the heat generated is distributed throughout all parts of the two flow paths.

In particular, the heat exchangers 40 and 44 provide the most direct means of heat exchange between the two flow paths. The hot water for space heating application in the inner pipes 40—1 and 44—1 exchanges heat with the water for the domestic hot water supply in the outer concentric jackets or pipes 40—2 and 44—2.

It should be particularly noted that the direction of flow of the two distinct paths for space heating and the domestic supply are mutually opposite. They flow in opposite directions through the heating enclosure 37 generally, and through each of the heat exchangers 40 and 44 in particular. Thus, the space heating water enters the chamber 37 from the upper right at manifold 38, then goes downwardly on the right side of the chamber through inner pipes 40—1, then goes from right to left across the chamber through connecting pipes 42, and upwardly at the left side of the chamber through the inner pipes 44—1 to the manifold 46 at the upper left corner of the chamber. In contrast, the domestic hot water supply enters manifold 66 and proceeds to the upper left corner of the chamber via delivery pipes 68. It then proceeds downwardly on the left side of the chamber through the outer pipes lower region of the chamber through the connecting pipes 70, and upwardly through the pipes 40—2 on the right hand side of the chamber, finally exiting at the upper right hand side of the chamber through discharge pipes 72 to the manifold 74 before going on to the coil 76. In this way, the hotter end of the space-heating waterflow path, i.e. manifold 46 at the upper left, is paired with the relatively colder end of the hot water supply flow path, i.e. manifold 66 and discharge pipes 68.

Similarly, the hotter end of the domestic hot water supply flow path, specifically manifold 74 and discharge pipes 72 at the upper right hand corner of the chamber, is matched with the relatively colder end of the space heating waterflow path, manifold 78 at the upper right hand corner of the chamber. Efficiency of heat exchange between the two flow paths is thus promoted especially well, because the exchange takes place across the widest possible temperature differential. It is known that the rapidity and efficiency of heat exchange rises steeply as a function of the temperature differential.

In particular, within each of the heat exchangers 40 and 44, the same counterflow principle is maintained. Thus, the space heating water flows downwardly through the heat exchangers 40 and upwardly through the heat exchangers 44, while the domestic hot water runs in the reverse direction through each group of heat exchangers.

Heat exchange is further promoted within elements 40 and 44, by virtue of the fact that the outer jackets 40—2 and 44—2 contain a rather thin annular jacket of water surrounding the interior pipes 40—1 and 44—1 respectively. This thin body of water within the outer jackets has a relatively low thermal inertia, and thus heats up quickly as a result of its exposure to the flame, the rising hot combustion gases, and the heat exchange which takes place within the elements 40 and 44.

The net result of the system just described, is that very rapid heat transfer occurs from the flame issuing from the nozzle 16 to all the various water-containing elements within the heating enclosure, and also between the cooler water and the warmer water in the various parts of the two distinct flow paths described. Consequently, the system can afford to have a very high water circulation speed, thus delivering heating water and domestic hot water as rapidly as needed without thereby lowering the temperature of the water so delivered below the level which is desirable. In particular, the domestic hot water supply coil 76, although it only stores a small volume of water hot and ready for immediate use by virtue of its location within the heating chamber, and can also rapidly and continuously replace that volume of hot water with a fresh supply, adequately heated, when water is drawn off at a great rate for domestic use.

In order to increase the efficiency of operation of the invention, a shutoff valve 86 is provided in the conduit 52 between the pump 50 and the radiator system 53. The valve 86 is normally open to permit the free flow of fluid therethrough. A further valve 88 is positioned in a conduit 90 that connects between the conduit 52 and the pipe 34 to function as a bypass. The valve 88 is normally closed to close such bypass. The conduit 90 is normally positioned outside of the furnace area to achieve a temperature drop.

In the summertime, when it is undesirable to utilize the heating or radiator system 53, the normally opened valve 86 is closed, thereby isolating or closing off the apparatus to such heating system. The valve 88 is then opened to enable water to flow through the bypass conduit 90 and to complete its circuit through the system. This maintains the counterflow movement previously described. To provide for a completely efficient system, the return pipe 54 is extended at 92 for connection with an expansion tank located at the highest point of the piping network. Inasmuch as the expansion tank forms no part of this invention, the same is not illustrated in the drawing.

Thus, we have a system which is economical both from the standpoint of initial cost and fuel consumption, but which provides excellent space heating and hot water service for a large space, and supplies all requirements as rapidly as needed.

Since the foregoing description and drawings are merely illustrative, the scope of protection of the invention has been more broadly stated in the following claims, and these should be liberally interpreted so as to obtain the benefit of all equivalents to which the invention is fairly entitled.

I claim:

1. In a high velocity fluid heater having a heat source, a supply of fluid having two distinct inlet fluid flow paths in heat exchange relationship with each other and with said heat source, the improvement comprising:
   heat exchange means having respective channels for said distinct inlet fluid flow paths;
   said heat exchange means comprises a plurality of individual heat exchangers;
   said flow paths comprise respective manifolds distributing fluid to and collecting it from said heat exchangers respectively;
   each of said respective channels being in heat exchange relationship with the other of said respective channels; and
   the directions of fluid flow through said respective channels each being mutually opposed.

2. A fluid heater as in claim 1 further comprising, a heating coil connected to receive the outflow from one of said flow paths and situated in heat exchange relationship with said flow paths and said heat source.

3. A fluid heater as in claim 2 wherein, said manifolds are situated in heat exchange relationship with said heating coil and said heat source.

4. In a high velocity water heater having a heat source, a heating region adjacent said heat source, and two distinct waterflow paths situated in heat exchange relationship with each other within said heating region, the improvement comprising:
   respective distribution manifolds at the inlets of said flow path;
   said flow paths each having respective collection manifolds;
   a plurality of heat exchangers divided into a first group at one side of said heating region and a second group at the opposite side of said region from said first group;
   said flow paths including respective connecter pipes extending from respective heat exchangers of said first group on said one side of said heating region, transversely through a central part of said region between said groups of heat exchangers, to respective heat exchangers of said second group on said opposite side of said region; and
   each of said flow paths leading from said distribution manifold thereof through said heat exchangers of one of said groups on one of said sides of said heating region, through respective connecting pipes through said central part of said heating region, to said heating exchangers of the other of said groups on the other side of said heating region, and to said collection manifold thereof, in that order, whereby to maximize heating of said water.

5. A water heater as in claim 4, employing a counterflow principle, wherein;
   one of said flow paths leads from said distribution manifold thereof to said first group of heat exchangers through said connecting pipes thereof, to said second group of heat exchangers, and to said collection manifold thereof, in that order; and
   the other of said flow paths leads from said distribution manifold thereof to said second group of heat exchangers, through said connecting pipes thereof, to said first group of heat exchangers, and to said collection manifold thereof, in that order, whereby to put the hotter end of each of said flow paths in heat exchange relationship with the colder end of the other flow path.

6. A water heater as in claim 5 further comprising, a heating coil connected to receive the outflow from one of said collection manifolds, and situated substantially centrally between said opposite sides of said heating region.

7. A water heater as in claim 6 wherein, said distribution and collection manifolds are situated near said heating coil and within said heating region.

8. A water-heater as in claim 7 wherein, said heat exchangers comprise respective pairs of inner pipes and outer pipes in concentric relation with each other, one of each pair of concentric pipes comprising part of one of said flow paths, and the other of each said pair comprising part of the other flow path.

9. A high-velocity heat transfer apparatus comprising:
   a source of input fluid;

means dividing said input fluid into two separate input paths;

one of said paths having a temperature relatively greater than the other of said paths;

said paths moving in mutually opposite directions;

one of said paths being at least partly circumposed about the other of said paths whereby to facilitate heat exchange between the hotter end of one path and the colder end of the other path; a heating source directing heat across a heated region directed across each of said paths; and one of said paths having a separate fluid carrying pipe in the heated region to be heated by said heating source and said paths having portions thereof in the heated region.

10. Apparatus as in claim 9 wherein, said circumposed path parts comprise at least one concentric pair of pipes, said paths flowing through respective ones of said pair of pipes in opposite directions.

11. Apparatus as in claim 10 wherein:

a plurality of such pairs of concentric pipes are divided into two groups situated on mutually opposite sides of the region across which said heating source is directed; and a respective connecting pipe leads from one of the pipes of one group of said concentric pairs of one side of said region, across a central part of said region between said groups, to one of the pipes of the other group of said concentric pairs.

12. Apparatus as in claim 11 wherein, said separate fluid carrying pipe including a pipe coiled within said central part of said heated region.

13. Apparatus as in claim 12 further comprising:

respective distribution manifolds discharging into respective ones of said pipes of said concentric pairs; and respective collection manifolds into which said concentric pipes in turn discharge, said distribution and collection manifolds being situated within said heated region near said coiled pipe.